May 17, 1938.  E. J. SVENSON  2,117,750
LIQUID HANDLING MECHANISM
Filed Dec. 5, 1936  3 Sheets-Sheet 1
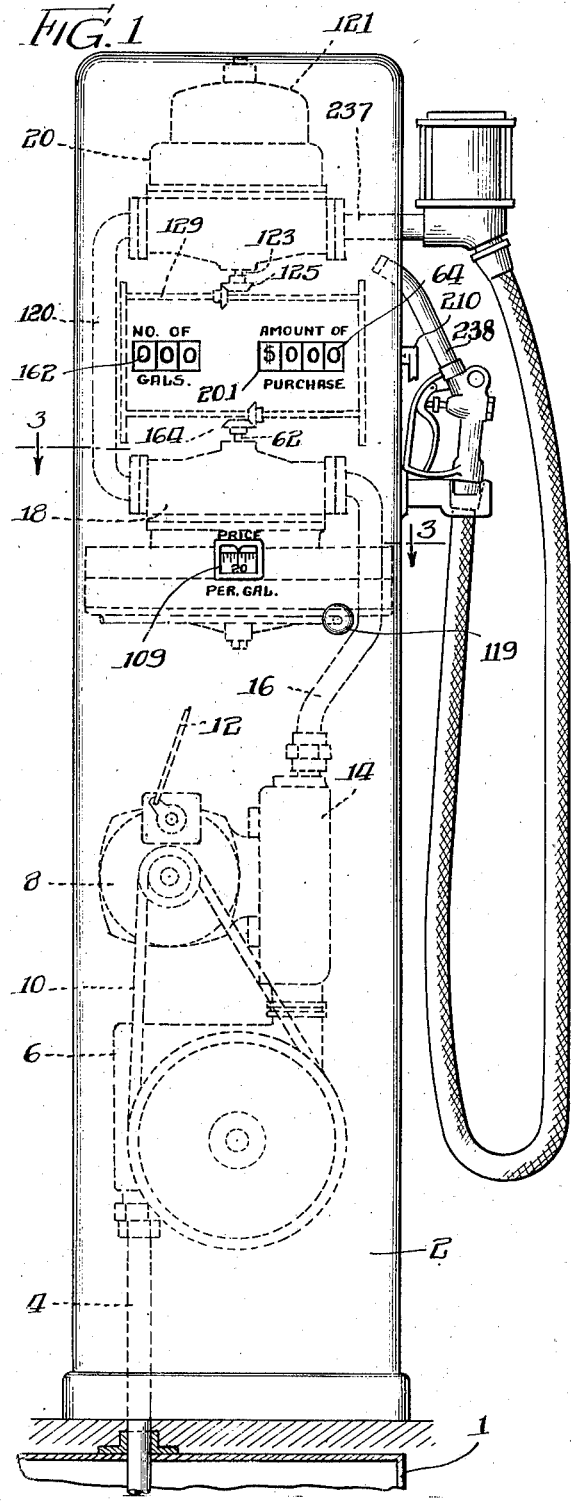
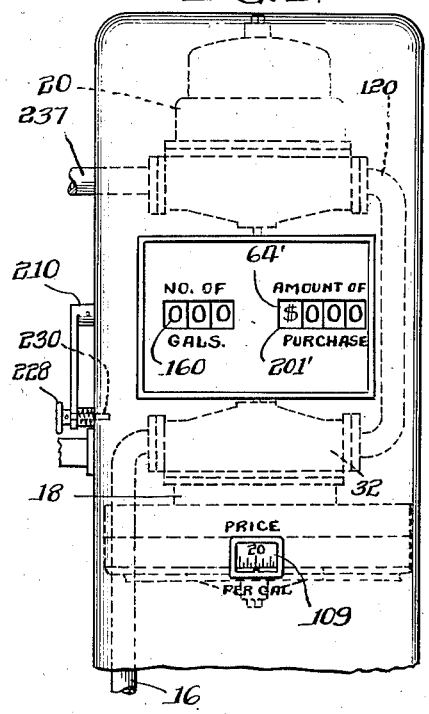
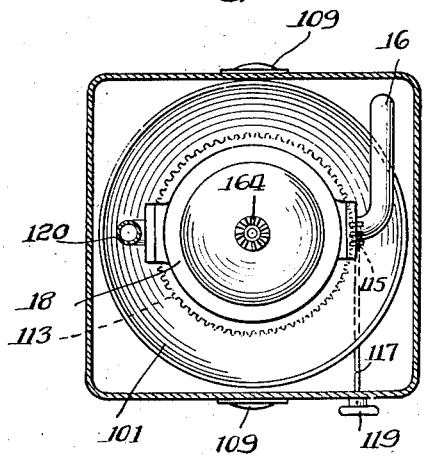
Inventor
Ernest J. Svenson
By Cox & Moore attys

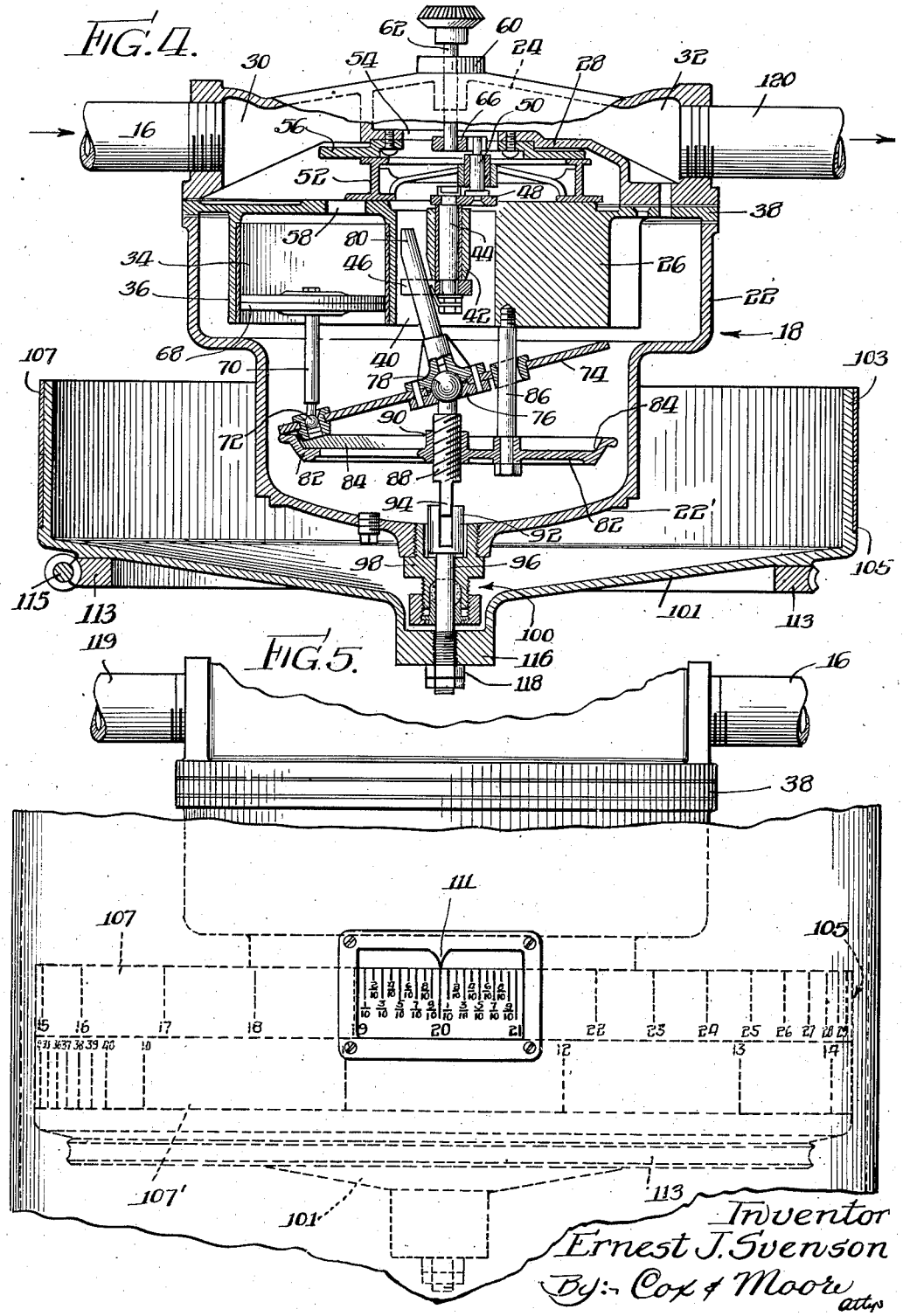

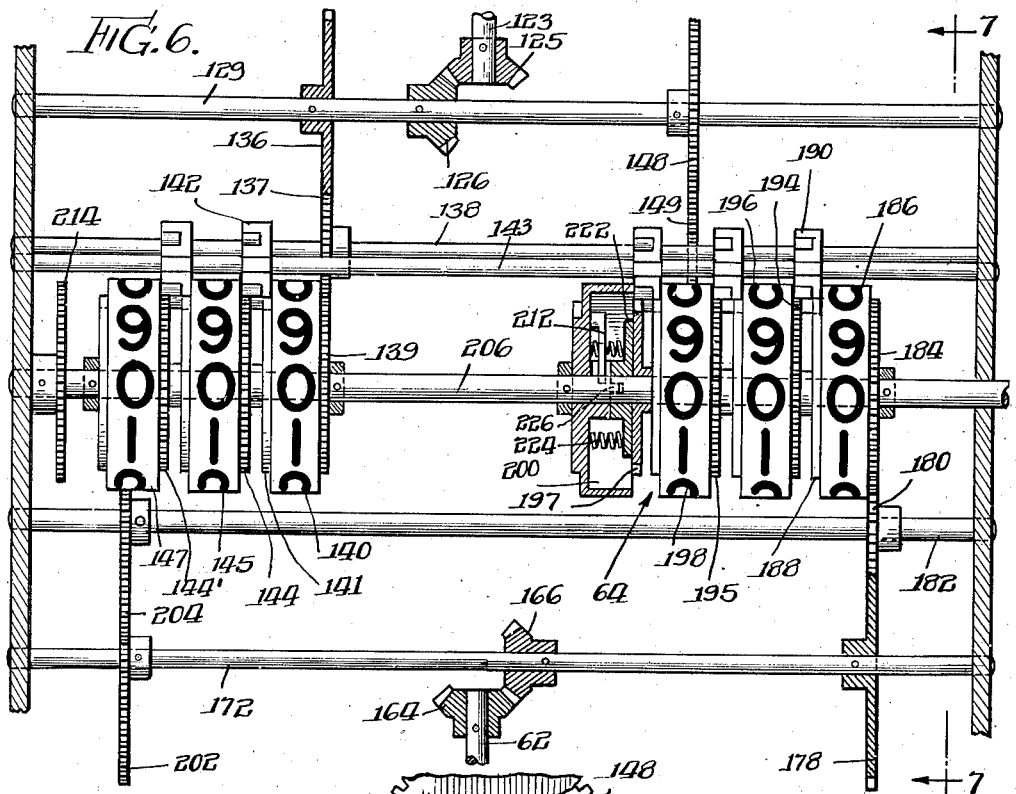
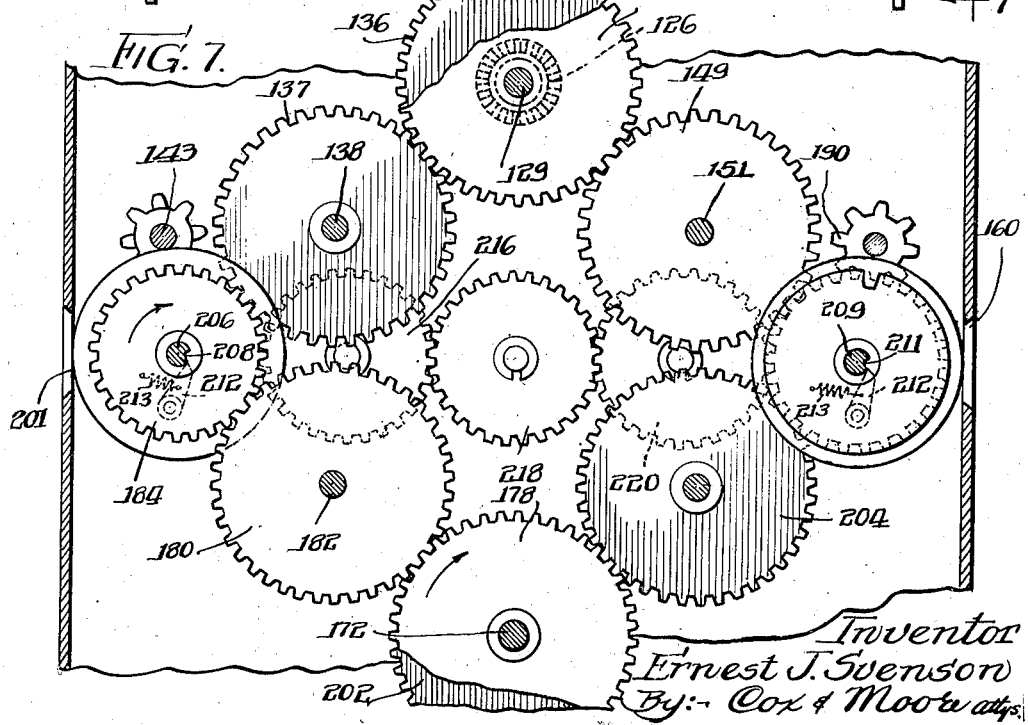

Patented May 17, 1938

2,117,750

UNITED STATES PATENT OFFICE 2,117,750

LIQUID HANDLING MECHANISM

Ernest J. Svenson, Rockford, Ill., assignor, by mesne assignments, to Petrolator Corporation, a corporation of Illinois Application December 5, 1936, Serial No. 114,329

34 Claims. (Cl. 221—95)

My invention relates to liquid dispensing devices and to an improved type of metering device usable in connection therewith.

The present invention is concerned with apparatus for providing a simple type of so-called computing gasoline pump, and among the objects of my invention are to provide a simple, efficiently operated, economical liquid dispensing pump which will dispense liquid continuously from a source of supply, which will continuously and at any instant indicate the amount or volume of liquid dispensed, and the total cost of such volume at a selected price per unit of volume, and in addition provides means for adjustably changing the price per unit of volume by adjustment of the metering mechanism of the device in a way such that the cost computing mechanism will automatically register the total cost of liquid dispensed at the newly selected price per unit of volume; to provide an improved type of liquid metering device for use in a liquid dispensing pumping apparatus of the herein described type, to indicate at all times the unit price per gallon at which the device is set to calculate; and to provide these and other objects of invention which will be apparent from a perusal of the following specification when taken in connection with the following drawings, wherein Figure 1 is a side elevational view of a selected embodiment of my invention as applied to a price computing gasoline dispensing pump;

Figure 2 is a view of the reverse or opposite side of the upper portion of the pump shown in Figure 1;

Figure 3 is a plan sectional view taken on line 3—3 of Figure 1;

Figure 4 is a sectional view of one of the liquid dispensing devices or meters used in my improved invention;

Figure 5 is an enlarged view of the price per gallon dial;

Figure 6 is a view through the cost and volume indicating wheels; and

Figure 7 is a view taken on line 7—7 of Figure 6.

In general, my invention resides in the provision of a price computing liquid or gasoline dispensing pump which includes the utilization of two meters or liquid displacement devices disposed in series in a flow line through which liquid to be dispensed flows under pressure, and wherein the flow of liquid operates movable displacement mechanism in each of the meters so as to cause each of said movable displacement mechanisms to move in proportion to the flow of liquid therethrough and wherein one of said meters is provided with indicating mechanism operable by its displacement mechanism to indicate the volume, amount, or quantity of liquid flowing through the dispensing line and wherein the other meter is provided with cost indicating mechanism operable by its displacement mechanism and wherein adjustment means is provided for the displacement mechanism of said last mentioned meter adjustable in accordance with variations in unit cost per unit amount or volume of the liquid to be dispensed so that upon movement of the displacement mechanism, as controlled by any selected adjustment, by the flow of the liquid being dispensed, said cost indicating mechanism actuatable by said movable displacement mechanism will indicate at any instant the total price of the liquid dispensed through said meter at the selected cost per unit of volume. In addition, my invention includes, as a variation or modification of the invention, the utilization solely of the latter described meter as a means for continuously and immediately indicating the total cost of liquid dispensed through said meter at a selected price per unit volume, indication of the volume or amount or liquid corresponding thereto being omitted. In addition, my invention includes a simple, economical arrangement of mechanism for indicating the unit price at which the cost meter is set to compute and for selectively changing the computing price per unit of volume to accord with the existing trade price of the liquid, be it gasoline or what not, for any selected time, and wherein the price indicating mechanism will automatically, continuously, simply and efficiently indicate the total cost of the gasoline so being metered and dispensed.

Referring now to the drawings in detail, I have illustrated my invention as applied to a gasoline dispensing system particularly of the well-known computing pump type which, if desired, may include an upright dispensing housing 2 adapted to rest on any suitable support and wherein is housed a flow line which includes as a part thereof the pipe or other conduit 4 having its lower end connected to a source of liquid, such as a reservoir, located in the ground or in any desirable place. In this housing is likewise located any suitable type of pump 6 having its inlet connected to the conduit 4. The pump is shown as being driven by an electric motor 8 through the instrumentality of the belt gearing 10. A switch 12 for operating the electric motor may be provided. The pump 6 preferably discharges into the usual type of air release or relief mechanism 14 of conventional construction and thence to a continuation 16 of the flow line 4. The housing 2 likewise encloses the liquid measuring mechanism which, in the instance illlustrated in Figure 1, comprises the two meters 18 and 20. These meters may be of any conventional construction and may be preferably, although not necessarily, of the general construction shown in the patents to Blum No. 1,423,597, of July 25, 1922, and No. 1,977,424, of October 16, 1934, except that one of said meters is modified so as to be adaptable to produce the functions and advantages disclosed and claimed herein.

Referring particularly to Figure 4 of my drawings wherein the meter 18 shown in elevation in Figure 1 of the drawings is disclosed, it will be seen the meter casing comprises a bowl 22, a cover 24 and a cylinder block 26 secured by and between the bowl and cover. The cover has partition means 28 defining an inlet chamber 30 and an outlet chamber 32. The cylinder block 26 is formed with a plurality of circularly arranged cylinders 34, there being preferably five such circularly arranged cylinders. These cylinders are defined by cylindrical walls depending from a plate 38 which is secured at its edges by and between the edges of the bowl 22 and the cover 24. The cylinder block is formed with a central channel 40 opening at one end within the bowl 22 and at the other end in the cover. In this channel the cylinder block is formed with a bearing 42 in which is mounted shaft 44 carrying at one end an outstanding arm 46 and at the other a crank arm 48. This arm 48 carries a pin 50 for driving a valve 52 of preferably annular construction and arranged to operate between the facing surfaces of the plate 38 and the partition 28. This partition has an opening 54 and carries an annular bearing plate 56 for the valve which plate is secured to the partition around said opening 54. The plate 38 also is formed with port openings 58 which communicate with the cylinders 34, said ports 58 opening into the discharge space 34, of the cover on one side of the partition 28. The cover 24 also provides a bearing 60 for a shaft 62 which extends outwardly of the cover and is provided with means drivingly connecting with a cost register 64. The shaft 62 at its inner end is formed with an arm 66 which engages the valve pin 50 so that rotation of the shaft 44 in its bearing will gyrate the valve 52 between the facing surfaces of the plates 38 and 56 and will also serve to turn the shaft 62.

The gyration of the valve 52 is adapted to cause it to slide successively around and across the ports 58 whereby to successively communicate said ports alternately with the outlet space 32 and with the inlet space 30 through the annular valve and the opening 54 of the partition 28. A piston 68 is arranged in each cylinder and carried on a piston rod 70 which extends out of the open end of the cylinder and is pivotally connected as by means of a bearing 72 in the edge of a wobble plate 74. This wobble plate may be formed and mounted in any suitable or preferred fashion, but I have shown a plate comprising a disc formed with means 76 at its center for tiltingly mounting the same on a suitable support which, as shown in the illustrated embodiment, comprises a ball 78. The wobble plate also carries a projecting finger 80 comprising a stem extending normally to the plane of the plate with the axis of the stem passing through the center of the ball support element 78. As the cylinder ports 58 are alternately exposed to the inlet space 30 and the outlet space 32 as heretofore mentioned, the several pistons 68 will be caused to reciprocate in the cylinders, thus alternately depressing and raising the edges of the wobble plate which is thus caused to gyrate on the support 78. Gyration of the wobble plate in this fashion will cause the stem 80 to rotate about the shaft 44 and since the stem 80 extends in position to engage the arm 46, operation of the wobble plate in the manner described results in the rotation of the shaft 44 and operation of the valve 52 and the indicator driving shaft 62 in the manner described.

It will be seen that liquid passing through the meter from the inlet chamber 30 to the outlet chamber 32 will flow through the measuring cylinders 34 and will cause rotation of the wobble plate and hence of the shaft 62 in proportion to the volume of liquid thus delivered through the cylinders. This volumetric measurement may be shown in accordance with my invention on the price indicator 64 in terms of the value of the liquid so metered.

Means is provided for adjusting the meter in order to compensate for changes in the price of the liquid so that the indicator 64 may show the value of metered liquid throughout a price range, the apparatus being readily adjustable to any price within said range. In accordance with my present invention this adjustment is accomplished by providing means for changing, in accordance with change in price, the ratio of displacement of the wobble plate and associated metering mechanism with respect to the total liquid passing through the meter. There is provided a track plate 82 having a circular track 84 along which the marginal edges of the wobble plate may roll during its gyratory movement on the ball bearing support 78. This track plate 82 is supported rigidly on and at a predetermined fixed distance with respect to the bearing block 26 by means of support pins 86, the plate 82 being mounted within the bowl 22 opposite the open ends of the cylinders 34.

In accordance with my invention, the ball bearing 78 is adjustably mounted with respect to the plate 82, the same being accomplished in the illustrated embodiment by forming the ball 78 on the end of a threaded stem 88 which threadingly fits in a correspondingly threaded sleeve 90 formed centrally in the plate 82. By turning the stem 88 in the sleeve 90, the elevation of the ball 78 with respect to the plate 82 may be adjusted and since the position of the pistons 68 at one end of their strokes is determined by the rolling engagement of the wobble plate edges on the track 84, it will be seen that the normal movement or stroke of the pistons in the cylinders will be determined by the adjusted spacement between the ball bearing 78 and the track plate 82. If this adjusted distance is reduced by adjusting the stem 88 in the track plate, the stroke of the pistons will be correspondingly reduced and vice versa. At the bottom of the bowl 22 is a key 92 provided with a transverse recess for receiving a projection 94 formed on the end of the stem 88 below the plate 82. The key 92 extends within the bowl 22 and is provided with a shaft 96 which extends through a cover cap 98 threaded for engagement in liquid-tight fashion in an opening formed in the bottom of the bowl 22 opposite the end of the stem 88. The end of the stem 96 projects outwardly of the cover cap 98 which is provided with suitable packing means shown generally at 100 for preventing leakage of liquid from the bowl 22 along the stem 96 through the cover cap 98.

For the purpose of accurately adjusting the meter to compensate for variations in prevailing price of liquid being metered thereby, I have secured to the projecting end of the stem 96 a cup-shaped dial element 101 having a cylindrical peripheral wall 103 on the outer surface of which is mounted a price scale carrying element 105. The element 105 is formed with suitable indicia and graduations comprising the price range within which the meter is adjustable, there being preferably a pair of identical scales 107 and 107' relatively displaced on the annular scale carrying element 105 by an angular distance of 180 degrees. The casing 2 is provided in its opposite sides with window openings 109 in position one opposite to one of the scales 107 and the other opposite the other scale 107', said windows 109 being disposed on opposite sides of the housing 2.

The windows 109 are each provided with index means 111 comprising pointers adapted to register with the graduations of the scales 107 in order to indicate the adjusted position of the meter in terms of the prevailing price of the liquid being measured. Obviously, these index means 111 could be disposed upon the casing of the meter in the event that the measuring mechanism is not enclosed in a housing suitable for mounting the pointers. Furthermore, the scale carrying means 105 may be mounted on the casing of the meter or on any suitable scale carrier which is stationary with respect to the meter casing in which case the index means 111 may be mounted on the frame 101.

The adjustable frame 101 may, of course, be directly and manually shifted. However, in the present embodiment where the apparatus is enclosed in the housing 2, I prefer to provide means operable outwardly of the housing comprising a handle drivingly connected with the frame 101 for accomplishing the adjustment thereof. To this end I have shown on the drawings an annular worm gear 113 formed on the frame 101 with which gear is engaged a worm 115 having a shaft 117, Fig. 3, suitably supported in and on the casing 2 and extending through the wall of said casing and provided with a knob 119 outwardly of the casing for turning the same.

In order to insure that the scales 107 are properly indexed, I may provide any suitable mechanism as, for example, notches in the frame 101 or the driving mechanism thereof and spring pressed detent means adapted for engagement in said notches in order to insure that when adjusted at or near a position of price adjustment, the adjusted mechanism will be properly indexed in order thus to avoid any possibility of inaccurate indexing due to parallax.

Means may be provided which may be of any desired construction for adjusting the stem or shaft 96 with relation to the hub 116 of the scale 101 so that any wear of the pistons, due to repeated use, may be compensated for without disturbing the proper calibrations and setting of the scale proper relative to its adjustment 88 for price changes. This may be accomplished by an ordinary type of threaded connection, plus a lock-nut 118 for holding the shaft 96 from rotation relative to the hub 116.

By means of this construction, the scale 101 may be rotated relative to the shaft 96 to bring the parts into proper relation, after which the lock-nut 118 is tightened and the scale 101 will thereupon be secured against movement with respect to shaft 96, so that the scale may be subsequently rotated bodily for accomplishing the adjustment of the piston stroke, as herein set forth.

The liquid passing from the meter 18 through the outlet 120 passes into the second meter 20 shown in Figure 1. For purposes of convenience in operation and compactness, this meter is shown as inverted and is identical in construction to the meter shown in Figure 4, except that the dial 103 and its cooperative mechanism are not necessary. In other words, in the meter 20 the upper portion of the meter comprises the curved top wall 121, which corresponds to the curved bottom wall of the bowl 22' of the meter shown in Figure 4, and the end of the mechanism for adjusting the wobble-plate, such as the shaft 96 of the meter shown in Figure 4, will project through the top of the bowl wall 121 whereby the wobble-plate of this meter may be adjusted to take up wear, if desired.

Inasmuch as otherwise the details of construction of this meter are identical with the meter disclosed in Figure 4, no further description thereof is deemed necessary other than to say that the driven shaft 123 thereof projects downwardly and is provided with a beveled gear 125 which in turn drives another beveled gear 126, Figs. 6 and 7, secured to shaft 129.

A gear 136, also secured to shaft 129, drives another gear 137 fixed on a shaft 138. This gear 137 in turn drives a gear 139 frictionally connected to the lowest order indicating dial 140. Dial 140 has formed on its opposite side a Geneva one-toothed gear 141 which in turn drives a Geneva gear 142 on shaft 143, which in turn drives a gear 144 arranged to frictionally drive the second order volume indicating dial 145. In a similar manner this dial 145, through a Geneva movement, drives a third order dial 147. The three dials 140, 145 and 147 constitute the volume indicating dials.

In a similar manner a gear 148 pinned to the shaft 129 drives a gear 149 which in turn drives a gear frictionally connected to the lowest order volume indicating dial on the other side of the housing just as the gear 139 is arranged to frictionally drive the dial 140 hereinbefore described, and in a similar manner. Through a series of dials and attached gears and Geneva movements, three volume indicating dials on the opposite side of the housing are operated and are visible through the window 160 that corresponds to a window 162 on the first-mentioned side of the pump casing.

Referring again to the shaft 62 of Figure 4 of the drawings and also of Figure 1, this shaft is the driven shaft of the meter 18. It drives a gear 164 fixed on shaft 62 and, as shown in Figure 6, this beveled gear drives another beveled gear 166 fixed to shaft 172. A gear 178, also fixed to shaft 172, drives another gear 180 on a shaft 182, which gear 180 in turn drives a gear 184 frictionally connected to the lowest order price indicating dial 186. This dial is similar in construction to the gallon indicating dials hereinbefore described. This dial 186 has on its opposite side a one-tooth Geneva gear 188 which drives a Geneva gear 190 which in turn drives another gear 194 likewise arranged to frictionally drive the second order dial 196. In sequence, there are provided other dials 198 and 200 which are likewise driven through similar Geneva gear movements. These dials 186, 196, 198 and 200 constitute the price indicating mechanism 64 or register for the pump. These price indicating dials are duplicated on the other side to be observable through appropriate windows 201 and 201'. To carry this out, shaft 172 has fixed thereto a gear 202 which in turn drives another gear 204 which is in turn arranged to drive the first of a corresponding series of price indicating dials 64' on the opposite side of the housing, and these dials, in similar manner, are driven through appropriate Geneva movements. All of the price indicating dials and volume or gallon indicating dials are loosely mounted on their respective shafts 206 and 209, as are their driving gears 139, 144, 184, 194, etc.

Mounted within each dial is a friction disc, such as the disc 222 mounted within the dial 200. This disc 222 is spring-pressed against the surface of the gear 197 by springs 224, and also this disc has a driving connection with the dial 200 through a key 226, which key is on a hub formed on the inner lateral wall of the dial 200. Upon rotation of the gear 197, during a dispensing operation, the gear 197 will drive the dial 200 through the friction disc 222. This same driving connection is provided between each one of the gears, such as 184, 194, 197, 139, 144 and 144', and the dial adjacent such gear.

In order to reset these dials to initial or zero position after a dispensing of the gasoline or other liquid, suitable mechanism is provided. Shaft 206 has on its extending end a crank handle 210 which, in order to reset the dials to zero, must be operated at the end of every dispensing operation or before the next dispensing operation takes place. The shaft 206 has a groove 208 cut longitudinally thereon which, upon rotation of the handle 210 in a clockwise direction (see Figure 7), engages a pawl 212 at some time during its complete rotation. A pawl 212 is mounted on the inward side of each of the dials (see Figure 6) and each has a spring 213 to keep it in engagement with the side of its shaft. By turning the handle 210 the notch 208 in the shaft 206 engages the pawls 212, thereby turning the dials to which the corresponding pawls are attached. In this way the dials are set to a starting or zero position and are ready for another indicating operation. The driving gears 139, 144, 184, 194, etc., for the numeral dials do not interfere with the zero setting of the dials due to the fact that the gears are frictionally connected to the dials, as previously described.

Means is provided for insuring that on a single rotation of the resetting shafts 206 and 209, the crank handle 210, in order to complete a resetting, is rotated a complete revolution or 360 degrees. The end of the handle 210 carries a spring-pressed latch or pin 228 which registers with a small opening 230 in the side of the housing. When the handle 210 has been rotated one revolution the end of the spring-pressed handle 228 will automatically snap in the opening 230 in the housing. Upon the completion of one revolution, the resetting will have been accomplished and it prevents the operator from passing the zero positions on the dials. It must be obvious that it is only one of many devices for effecting this result. Other means well known in the art may be utilized for doing this.

The shaft 206 carries on its inner end a gear 214 fixed to the shaft 206. This gear in turn drives an idler gear 216 which in turn drives another gear 218, and this gear another idler gear 220 which correspondingly drives the reset shaft 209 which has a longitudinal notch 211 adapted to cooperate with the pawls 212 on the dials.

The resetting operation resets the gallonage and total amount dials to zero but does not affect the meter drive shafts 123 and 62 due to the friction connections, previously described, which allow them to remain stationary while the resetting occurs.

It will be understood that any desired type of conventional resetting mechanism, either manual or power-operated, may be utilized in connection with this invention, also that means well known in the prior art may be utilized for interlocking the manual or power reset means with the support for the hose nozzle when not in use.

In some instances it is within the contemplation of my invention to provide a gasoline computing pump which will indicate only the price per gallon and the total cost, without indicating the volume of liquid dispensed. In such instance, the mechanism illustrated in Figure 1 of the drawings may be employed without using the second meter corresponding to the meter 20 in said Figure 1, in which case the discharge from the first meter 18 will be directly through the pipe 237 and thence into the sight glass and out through the dispensing nozzle 238. In a simple type of mechanism of this kind the dispensing will take place governed solely by the total cost and not by the gallon. In other words, if a purchaser asks for five dollars' worth of gasoline, when the price registering dial indicates five dollars, the dispensing nozzle is closed. There will be no volume indicating dials.

It is also within the contemplation of the invention that a very cheap and simple form of meter may be used as the meter for operating the volume register. In this instance the cost register operated by the accurate meter 18 would be relied upon to show the exact value of the gasoline dispensed, and the volume register operated by the inexpensive meter utilized only to give an approximation of the volume of gasoline dispensed. One such simple form of meter which might be used would be a simple form of gear meter analogous in construction to a standard gear pump.

In the operation of the device, as shown in Figure 1, when a customer drives up to a gasoline dispensing pump embodying the features of my present invention, the operator will take the nozzle off the hook and manually throw the hook to raised position, as is well known in the art. This operation will then actuate the switch 12 which will start the pump, the pump bypassing in the usual manner until the nozzle valve is open. The operator then walks over to the tank of the automobile, inserts the nozzle therein and opens the valve. The pump will then force the liquid through the flow line 16 through the first meter 18, at which time the liquid flow will actuate the pistons therein to in turn actuate the wobble-plate 74 to actuate the valve mechanism and rotate the shaft 62 in proportion to the liquid passing through the meter. Each cycle of operation of the meter operates the shaft 62 one revolution which correspondingly operates the cost register through a predetermined or fixed given registration. It is to be understood that the operator, through the mechanism 115 and the control handle 119, has set the price per gallon register or scale to whatever price gasoline is selling for that day. The setting of this scale through rotation of the shaft 96, as hereinbefore described, and the movement of the screw 88, will raise or lower the ball 78 of the wobble plate to set the stroke of the pistons in the cylinders, thereby determining the amount of liquid that will be displaced per cycle of operation in the cylinders by those pistons in proportion to the selected price per gallon.

Assuming, for example, that the mechanism is so designed that it will dispense gasoline from a price range of ten to forty cents a gallon, the setting of the scale 101 to the ten cents per gallon indication will raise the ball 78 to its uppermost position, thus imparting maximum displacement to the pistons 68. When one gallon of gasoline is passed through the meter the gearing connecting the meter to the cost register is such that the cost register will indicate ten cents. Assuming, now, that it is desired to dispense gasoline at, say, twenty cents a gallon, the dial 101 will be operated to lower the ball 78 and reduce the displacement of the piston 68 by one-half, and when a gallon of gasoline is passed through the meter, the metering mechanism will be operated through twice the distance that it would be with a ten cent setting and will accordingly operate the cost register twice as far to indicate twenty cents.

The calibrations on the dial 101 are so arranged that they indicate the proper positioning of the dial to move the ball 78 to the position necessary to cause the metering mechanism to move the cost register the proper distance as gasoline is dispensed therethrough. These calibrations may be empirically arranged, that is, the scale may be initially laid out by rotating it to a given position, determining the amount of movement imparted to the cost register by such positioning as a given quantity of gasoline is passed through the meter, and then marking upon the scale the proper unit price indication corresponding to such cost registration, or the scale may be graduated in accordance with mathematical calculations. The empirical system of scale calculation would insure that any peculiarities of the meter were compensated for. While I have shown the calibrations in cents and tenths of a cent, it is to be understood that the scale can be calibrated in any foreign money value.

It is also to be understood that the spacing of the graduations upon the price dial may be made substantially uniform by imparting a variable pitch to the screw connection 88, 90.

In initially setting the device, the adjustment for the volume meter 20 is first operated to accurately adjust the meter so that, when a measured gallon of gasoline is passed through the system and the meter 20, the volume register will correctly indicate exactly one gallon. The adjustment of the shaft 96 of the cost meter 18 is then adjusted so that said meter 18 will impart a registration of, say, twenty cents, to the cost register as said measured gallon of gasoline is passed through the meter 18 and the system. The dial 101 is then moved to indicate a unit price of twenty cents a gallon and locked to the shaft 96 by the lock-nut 118, which shaft 96 has been previously positioned, as described. This constitutes the initial exact setting of both meters to insure accurate registration of both volume and price.

Rotation of the registering shaft 62 will in the manner hereinbefore described rotate the price indicating dials to continuously and progressively indicate visually to the operator the cost of the total volume or amount of gasoline which has been dispensed at any particular instant at said selected price per gallon. Simultaneously therewith the gasoline passing through the flow line will pass through the second meter 20, displacing the pistons thereof whereby to actuate the wobble-plate whereby to actuate the crank mechanism and rotate the shaft 123 of said meter, whereby to actuate the volume or amount indicating dials so that the operator is apprised of the total number of gallons of gasoline dispensed at any instant. Simultaneously, the price indicating dials will indicate the price of that amount of gasoline that has been dispensed at that instant. By looking through the window below the price and volume windows, the setting of the price per gallon dial may be observed on either side of the housing. Thus, I have provided a simple type of gasoline computing pump which will accomplish all of these functions and which will permit a simple and practically instantaneous adjustment of the price per gallon dial and which will automatically thereafter cause the total price indicating dials to compute the gasoline at the newly selected price per gallon.

It is to be understood that other types of meters may be utilized in lieu of the type of meter shown and that it is not necessary to invert the meter 20 in the manner illustrated in Figure 1 as the meter may be utilized in the same position in which the meter 18 operates. I have shown the upper meter reversed in order to bring the two meter drive spindles close to the volume and price indicating dials.

The gist of my invention relates to the provision of metering mechanism in the liquid flow line and operable thereby, including two independent means, each operated by a movable element of the metering mechanism in proportion to the flow of liquid through the metering means, one of said means operating a volume indicator or register to indicate the total amount or volume of liquid passed through the flow line at a given instant, and the other of said means operating a cost or price register to indicate the total cost or price of the volume of liquid registered by the volume indicating register, the arrangement including mechanism for varying the volumetric displacement of the meter operating the price registering device in accordance with changes or variations in the price per unit of volume of the liquid being metered.

Specifically, in the embodiment of my invention illustrated in the drawings, the invention comprises the inclusion of a first meter in the liquid flow line having cylinders and pistons, and a meter shaft rotated thereby with a volume register operated by the rotation of the meter shaft, together with a second meter in series in the liquid flow line likewise having cylinders and pistons, and a meter shaft operable thereby and wherein means is provided for altering the displacement of the pistons of the second meter in and relatively to their cylinders in accordance with changes in units of price per unit of volume of the liquid dispensed, in order that the dispensing apparatus may show not only the volume of liquid dispensed but also the money value of such liquid at any unit volume price at which the price computing mechanism may be adjusted within existing price ranges of the liquid dispensed.

It will be manifest that, instead of adjusting the strokes of all the pistons, I may provide an adjustment for one or more of the pistons, in which event the proportion of adjustment of said one or more pistons must be somewhat larger than the adjustment when means is provided for adjusting all of the pistons.

Having thus described my invention, what I claim as new and desire to secure by Letters Patent is:

1. A meter having fluid displacement means, means for conducting fluid under pressure through said meter to actuate said fluid displacement means in proportion to the volume of fluid flowing through said meter, adjustable means including means calibrated to correspond with variations in price per unit of fluid volume being metered, and means actuated by a predetermined adjustment of said calibrated means for correspondingly adjusting the displacement of said fluid displacement means, said adjustable means including provisions for progressively increasing the adjustment of the displacement means with respect to the spacing of the calibrations of the calibrated means throughout the range of adjustment.

2. A meter, liquid displacement means therefor operated by the flow of liquid through said meter, price registering means operated by said displacement means in proportion to the volume of liquid displaced thereby, and means for adjustably varying the operation of said displacement means by the liquid flow in accordance with units of price per volume of the liquid flowing through said meter.

3. A meter having a cylinder and a piston, means for conducting liquid under pressure through said meter to displace the piston relatively to the cylinder, price indicating means operated by the relative displacement of said piston and cylinder, and means for adjustably varying the amount of said relative displacement of said piston and cylinder by and during the passage of a predetermined volume of liquid through said meter for registering the price of liquid being metered in accordance with variations in price per unit of volume of the liquid being metered, and additional adjusting means for adjusting the position of said first named adjusting means.

4. A meter having a cylinder and a piston, means for conducting liquid under pressure through said meter to displace said piston relatively to the cylinder, price registering means to register the price of a predetermined amount of liquid passing through said meter, and means for adjusting the stroke of the piston relative to its cylinder for controlling the operation of the price registering means, said adjustment means including provisions for at least doubling the stroke of said piston.

5. In a gasoline computing pump, the combination of means forming a liquid flow line through which liquid is adapted to flow under pressure, means for controlling the flow of liquid through said line, two meters in series in said line, each meter having an operable element moved in proportion to the flow of liquid through said meter, volume registering means operated by the operable element of one of said meters, price registering means operated by the operable element of the second meter, and means for variably adjusting the movement of the operable element of said second meter in accordance with selected values of price per unit of volume.

6. In a liquid dispensing apparatus, the combination of a source of liquid supply, a pump having the suction side thereof connected to said source, a meter having its inlet side connected to said pump, a second meter having its inlet side connected to the discharge side of the first meter, dispensing means connected to the outlet side of said second meter, a shaft operated by the first meter and a shaft operated by the second meter, an indicating dial operated by the shaft of the first meter, a second indicating dial operated by the shaft of the second meter, one of said dials showing the amount of liquid dispensed by its operatively connected meter and the other of said dials showing the cost of the liquid dispensed by its meter, and means for varying the speed ratio of one of said dials with respect to the other of said dials.

7. In a liquid dispensing apparatus, the combination of a source of liquid supply, a pump having the suction side thereof connected to said source, a meter having its inlet side connected to said pump, a second meter having its inlet side connected to the discharge side of the first meter, dispensing means connected to the outlet side of said second meter, a shaft operated by the first meter and a shaft operated by the second meter, a registering dial operated by one of said shafts registering the amount of liquid dispensed by its meter, and a second dial operated by the second shaft for registering the cost of liquid dispensed by its meter, and means for selectively varying the speed of rotation of the second shaft by speed ratio adjustment thereof in proportion to variations in the unit cost of liquid dispensed per unit of measure.

8. A dispensing apparatus comprising a meter through which liquid passes, said meter having a shaft, the movement of which is proportional to the amount of liquid passed through the meter, registering means for said shaft, and a second meter through which said liquid passes, said meter likwise having a shaft, the speed ratio of movement of which is proportionate to the price of liquid passed through the second meter, and means for adjustably controlling the movement of the shaft of the second meter in proportion to the variations in unit cost of liquid dispensed per unit of measure.

9. In combination, means forming a source of liquid supply, a liquid flow line connected thereto, a pump for forcing liquid through said flow line, a meter disposed in said flow line, said meter having a plurality of cylinders, a piston in each cylinder, a meter shaft operated by the movement of said pistons in their respective cylinders, price registering means operated by the rotation of said meter shaft, and means for adjustably varying the stroke of said pistons in proportion to corresponding variations in unit cost of liquid dispensed through said flow line per unit of measure.

10. In combination, means providing a source of liquid supply, a liquid flow line connected thereto, a pump in said flow line for forcing liquid therethrough, dispensing means for controlling the flow of liquid through said flow line, means in the flow line operable by and in proportion to the liquid flow therethrough for registering the total volume of flow at a given instant, and additional means in the flow line and operated by the liquid flow for registering the total cost at a given instant of said volume of liquid registered by said first-mentioned registering means, and means for varying the total cost registration of said volume of liquid registered by said first-mentioned registering means at a given instant in accordance with variations in unit cost of liquid dispensed per unit of measure.

11. In a fluid dispensing apparatus, a source of fluid supply, dispensing means, a flow line connecting the source of supply with the dispensing means, a meter having displacement mechanism arranged in said flow line, a cost register controlled by the meter, and means to adjust the displacement mechanism of the meter in accordance with variations in unit cost per unit amount of the fluid to be dispensed, said adjustment means being mechanically connected to the displacement mechanism whereby to effect the control thereof.

12. In a fluid dispensing apparatus, a source of fluid supply, dispensing means, a flow line connecting the source of supply with the dispensing means, a meter having displacement mechanism arranged in said flow line, a cost register controlled by the meter, and means to adjust the displacement mechanism of the meter in accordance with variations in unit cost per unit amount of the fluid to be dispensed, said adjustment means being mechanically connected to the displacement mechanism whereby to effect the control thereof, an amount register, and means for operating the amount register in accordance with the amount of fluid passed through said displacement mechanism.

13. In a fluid dispensing apparatus, a source of fluid supply, dispensing means, a flow line connecting the source of supply with the dispensing means, a meter having displacement mechanism arranged in said flow line, a cost register controlled by the meter, and means to adjust the displacement mechanism of the meter in accordance with variations in unit cost per unit amount of the fluid to be dispensed, said adjustment means being mechanically connected to the displacement mechanism whereby to effect the control thereof, an amount register, and a second meter arranged in the flow line in series with the displacement mechanism of the first meter for controlling the operation of the amount register in accordance with the amount of fluid passed through said displacement mechanism.

14. In a liquid dispensing apparatus, a source of liquid supply, a flow line connected to said source, said flow line terminating in a dispensing nozzle having a valve for controlling the flow of liquid through the flow line, a pump for forcing fluid through the flow line, a meter having displacement mechanism arranged in said flow line adapted for operation during the flow of liquid therethrough, a cost register operated by said displacement mechanism through a fixed registration per cycle of operation of the mechanism, and means to adjust said displacement mechanism to vary the amount of liquid passed therethrough per cycle of operation in accordance with variations in unit cost per unit amount of the liquid to be dispensed, said adjustment means being mechanically connected to said displacement mechanism to control the adjustment thereof.

15. In a fluid dispensing apparatus, a source of fluid supply, dispensing means, a flow line connecting the source of supply with the dispensing means, a meter having displacement mechanism comprising a pair of relatively movable elements arranged in said flow line, a cost indicating register controlled by the meter, and means to adjust the displacement mechanism of the meter in accordance with variations in unit cost per unit amount of the fluid to be dispensed, said adjustment means being mechanically connected to the displacement mechanism whereby to effect the control thereof, and including provisions for at least doubling the relative movement of said elements.

16. A liquid dispensing apparatus comprising a source of liquid supply, dispensing means, a flow line connecting said source of supply and dispensing means, a meter having displacement mechanism comprising a relatively movable cylinder and piston construction arranged in said flow line, a cost register controlled by said meter, and means for adjusting the movements of said displacement mechanism in accordance with variations in unit cost per unit amount of the liquid to be dispensed, said adjustment means being mechanically connected to said displacement mechanism whereby to control the movements thereof.

17. A gasoline dispensing apparatus comprising a source of gasoline supply, dispensing means, a flow line connecting said source of supply and dispensing means, a meter having displacement mechanism arranged in said flow line, said displacement mechanism comprising a plurality of circumferentially arranged cylinder and piston constructions and a wobble plate connected to the pistons, a cost register operated by said meter, and means for adjusting the displacement mechanism in accordance with variations in unit cost per unit amount of the gasoline to be dispensed, said adjustment means including provisions for varying the stroke of the pistons within the cylinders to at least double the amplitude of the stroke throughout the adjustment range.

18. In liquid dispensing apparatus, the combination of a source of liquid supply, a pump, the inlet side of which is connected with said source, dispensing means, a meter connected to the outlet side of said pump and to said dispensing means, a cost indicating register operated by said meter, an amount indicating register, means for operating said amount indicating register in accordance with the amount of liquid passed through said meter, and means for varying the amount of liquid passed through said meter in accordance with the variations of unit cost of the liquid dispensed.

19. In liquid dispensing apparatus, the combination of a source of liquid supply, dispensing means, a meter connected to said source and to said dispensing means, a cost register, means for operating said cost register through a fixed registration per cycle of operation of said meter, an amount register, means for varying the amount of liquid passed through said meter per cycle of operation in accordance with variations in unit cost per unit amount of the liquid dispensed, and means for operating said amount register in accordance with the amount of liquid passed through said meter.

20. In liquid dispensing apparatus, the combination of a source of liquid supply, dispensing means, a meter, the inlet of which is connected to said source of liquid supply and the outlet of which is connected to said dispensing means, a cost indicating register, means for operating said cost indicating register through a fixed registration per cycle of operation of said meter, an amount indicating register, means for selectively changing the amount of liquid passed through said meter in accordance with variations in unit cost per unit amount, a second meter connected in series with the first meter and means operated by said second meter for operating the amount indicating register in accordance with the amount of liquid passed through the first meter.

21. In liquid dispensing apparatus, the combination of a source of liquid supply, dispensing means, means for causing a flow of liquid from said source to said dispensing means, a cost register, means responsive to the flow of liquid for operating said register through a fixed registration independent of the flow of said liquid, means for controlling the rate of flow of said liquid, and means for operating said controlling means to selectively change the rate of flow of said liquid in accordance with variations in unit cost per unit amount of the liquid being dispensed.

22. In liquid dispensing apparatus, the combination of a source of liquid supply, dispensing means, means for causing a flow of liquid from said source to said dispensing means, a cost register, means responsive to the flow of liquid for operating said register through a fixed registration independent of the flow of said liquid, means for controlling the rate of flow of said liquid, means for operating said controlling means to selectively change the rate of flow of said liquid in accordance with variations in unit cost per unit amount of the liquid being dispensed, an amount register, and means responsive to the flow of liquid for operating said amount register proportionately to said rate of flow.

23. In liquid dispensing apparatus, the combination of a source of fluid supply, a pump, the intake side of which is connected to said source, dispensing means, a meter connected to the outlet side of said pump and to said dispensing means, a cost register operated by said meter, and means for varying the amount of fluid passing through said meter in accordance with variations in the unit cost per unit amount of the fluid being dispensed.

24. In a liquid dispensing apparatus, the combination of a source of liquid supply, a pump, the inlet side of which is connected with said source, dispensing means, a meter connected to the outlet side of said pump and to said dispensing means, a cost indicating register operated by said meter, and means for varying the amount of liquid passed through said meter in accordance with the variations of unit cost of the liquid dispensed.

25. In liquid dispensing apparatus, the combination of a source of liquid supply, dispensing means, a meter connected to said source and to said dispensing means, a cost register, means operating said cost register through a fixed registration per cycle of operation of said meter, and means for varying the amount of liquid passed through said meter in accordance with variations in unit cost per unit amount of the liquid dispensed.

26. In a liquid dispensing apparatus, the combination of a source of liquid supply, dispensing means, a meter, the inlet of which is connected to said source of liquid supply and the outlet of which is connected to said dispensing means, a cost indicating register, means for operating said cost indicating register through a fixed registration per cycle of operation of said meter, and means for selectively changing the amount of liquid passed through said meter per cycle of operation in accordance with variations in unit cost per unit amount.

27. In liquid dispensing apparatus, the combination of a source of supply, dispensing means, means for measuring the liquid dispensed, a cost register, means connecting the register to said measuring means for operating said register through a fixed registration independent of the amount of liquid measured, and means for varying the amount of liquid passing through said measuring means in accordance with variations in unit cost per unit amount.

28. In liquid dispensing apparatus, the combination of a source of liquid supply, dispensing means, means for causing a flow of liquid from said source to said dispensing means, a cost register, measuring means responsive to the flow of liquid for operating said register through a fixed registration per unit of operation of the measuring means independent of the flow of said liquid, means for controlling the rate of flow of said liquid, and means for operating said controlling means to selectively change the rate of flow of said liquid through the measuring means per unit of operation thereof in accordance with variations in unit cost per unit amount of the liquid being dispensed.

29. In liquid dispensing apparatus, the combination of a source of liquid supply, dispensing means, a meter, the inlet of which is connected to said source of supply and the outlet of which is connected with said dispensing means, said meter comprising a measuring cylinder, a piston in said measuring cylinder, means operated by said piston, a cost register connected to said operated means, and fluid control means connected to said operated means for determining the amount of fluid passed through said measuring cylinder in accordance with variations of unit price per unit amount of liquid dispensed.

30. In liquid dispensing apparatus, the combination of a source of liquid supply, dispensing means, a meter, the inlet of which is connected to said source of supply and the outlet of which is connected with said dispensing means, said meter comprising relatively shiftable means for measuring the liquid passing through said meter, means operated by said relatively shiftable means, and flow control means connected to said operated means for varying the amount of liquid passed through said relatively shiftable means in accordance with the unit cost per unit amount of liquid dispensed.

31. In liquid dispensing apparatus, the combination of a source of liquid supply, dispensing means, a meter, the inlet of which is connected to said source and the outlet of which is connected to said dispensing means, said meter comprising relatively shiftable means for measuring the amount of liquid dispensed, a cost register, means operated by said relatively shiftable means for operating said cost register a fixed amount per cycle of operation of said relatively shiftable means, means connected to said operating means for controlling the flow of liquid passing through said relatively shiftable means, and means for controlling said flow control means selectively to change the amount of liquid passing through said meter in accordance with variations in unit cost per unit amount of liquid dispensed.

32. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost register, means operated by said relatively shiftable means for operating said cost register a fixed amount per cycle of operation of said plurality of relatively shiftable means, a rotary member connected to said operating means for controlling the flow of liquid passing through said relatively shiftable means, and means for controlling said rotary member selectively to change the amount of liquid passing through said meter in accordance with variations in unit cost per unit amount of liquid dispensed.

33. In liquid dispensing apparatus, the combination of a source of liquid supply, dispensing means, a meter, the inlet of which is connected to said source and the outlet of which is connected to said dispensing means, said meter comprising relatively shiftable means for measuring the amount of liquid dispensed, a cost register, means operated by said relatively shiftable means for operating said cost register a fixed amount per cycle of operation of said relatively shiftable means, means connected to said operating means for controlling the flow of liquid passing through said relatively shiftable means, and adjustable unit price indicating means for controlling said flow control means selectively to change the amount of liquid passing through said meter in accordance with variations in unit cost per unit amount of liquid dispensed.

34. In liquid dispensing apparatus, the combination of a source of liquid supply, dispensing means, a meter, the inlet of which is connected to said source and the outlet of which is connected to said dispensing means, said meter comprising a plurality of relatively shiftable means for measuring the amount of liquid dispensed, a cost register, means operated by said relatively shiftable means for operating said cost register a fixed amount per cycle of operation of said plurality of relatively shiftable means, a rotatary member connected to said operating means for controlling the flow of liquid passing through said relatively shiftable means, and adjustable unit price indicating means for controlling said rotary member selectively to change the amount of liquid passing through said meter in accordance with variations in unit cost per unit amount of liquid dispensed.

ERNEST J. SVENSON.